(12) United States Patent
Song et al.

(10) Patent No.: US 8,468,091 B1
(45) Date of Patent: Jun. 18, 2013

(54) TRADE-IN PROGRAM WITH ADVANCE PAYMENT

(75) Inventors: Weiying Song, Seattle, WA (US);
Ranjeet S. Sonone, Kent, WA (US);
Sandeep Bodapati, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/347,940

(22) Filed: Jan. 11, 2012

(51) Int. Cl.
*G06Q 40/00* (2012.01)

(52) U.S. Cl.
USPC .......................... 705/39; 705/14.1; 705/14.11

(58) Field of Classification Search
USPC ........................................ 705/14.1, 14.11, 39
See application file for complete search history.

(56) References Cited

U.S. PATENT DOCUMENTS

2004/0138911 A1* 7/2004 Oshima et al. .................. 705/1
2006/0085250 A1* 4/2006 Kantarjiev et al. ............. 705/11

OTHER PUBLICATIONS

PR Newswire. Digital Insight Introduces Next-Generation Payment Technology. [New York] Apr. 18, 2002: 1.*
Donald Davis. Smart cards in the United Sates: Evolution or revolution? Card Technology; Apr. 2002; 7, 4; ProQuest Central. p. 42.*

* cited by examiner

*Primary Examiner* — Muriel Tinkler
(74) *Attorney, Agent, or Firm* — Hope Baldauff, LLC

(57) ABSTRACT

An online merchant system provides a merchandise trade-in program that includes advance payment for items traded-in by qualified customers. When a request to trade-in an item is received from a customer, a determination is made as to whether an advance payment can be made for the item. If an advance payment can be made for the item, an advance payment for the total estimated trade-in value of the item is made to the customer. The advance payment may be made prior to shipment of the item to the merchant or when the merchant is notified that the item has been shipped. When the item is received by the merchant, the customer is debited if the actual value of the item is less than the advance payment and credited if the actual value of the item is more than the advance payment.

20 Claims, 7 Drawing Sheets

US 8,468,091 B1

TRADE-IN PROGRAM WITH ADVANCE PAYMENT

BACKGROUND

Many types of brick and mortar stores provide merchandise trade-in programs. Through such programs, a customer can bring a physical item, such as a video game, for instance, into a participating store and receive a store credit in exchange for the item. The store credit can then be used to immediately purchase other items in the store. Trade-in programs are popular with customers when offered through brick and mortar stores in part because customers can immediately receive payment in exchange for their items and immediately use the received payment to purchase other items.

Some online stores also provide trade-in programs. Customers of online trade-in programs typically ship items to be traded-in to an online merchant. When the online merchant receives the items, the merchant inspects the items and issues a payment to the customer based upon the actual condition of the items. Online trade-in programs do not provide advance payment to customers due to the risk of loss that might be incurred if a payment is made to a customer for an item that is never shipped to the merchant. The sometime significant delay in receiving payment for items traded-in through online trade-in programs can, however, be frustrating to the users of such programs and discourage the use of online trade-in programs.

It is with respect to these and other considerations that the disclosure made herein is presented.

DETAILED DESCRIPTION

Figure 1:
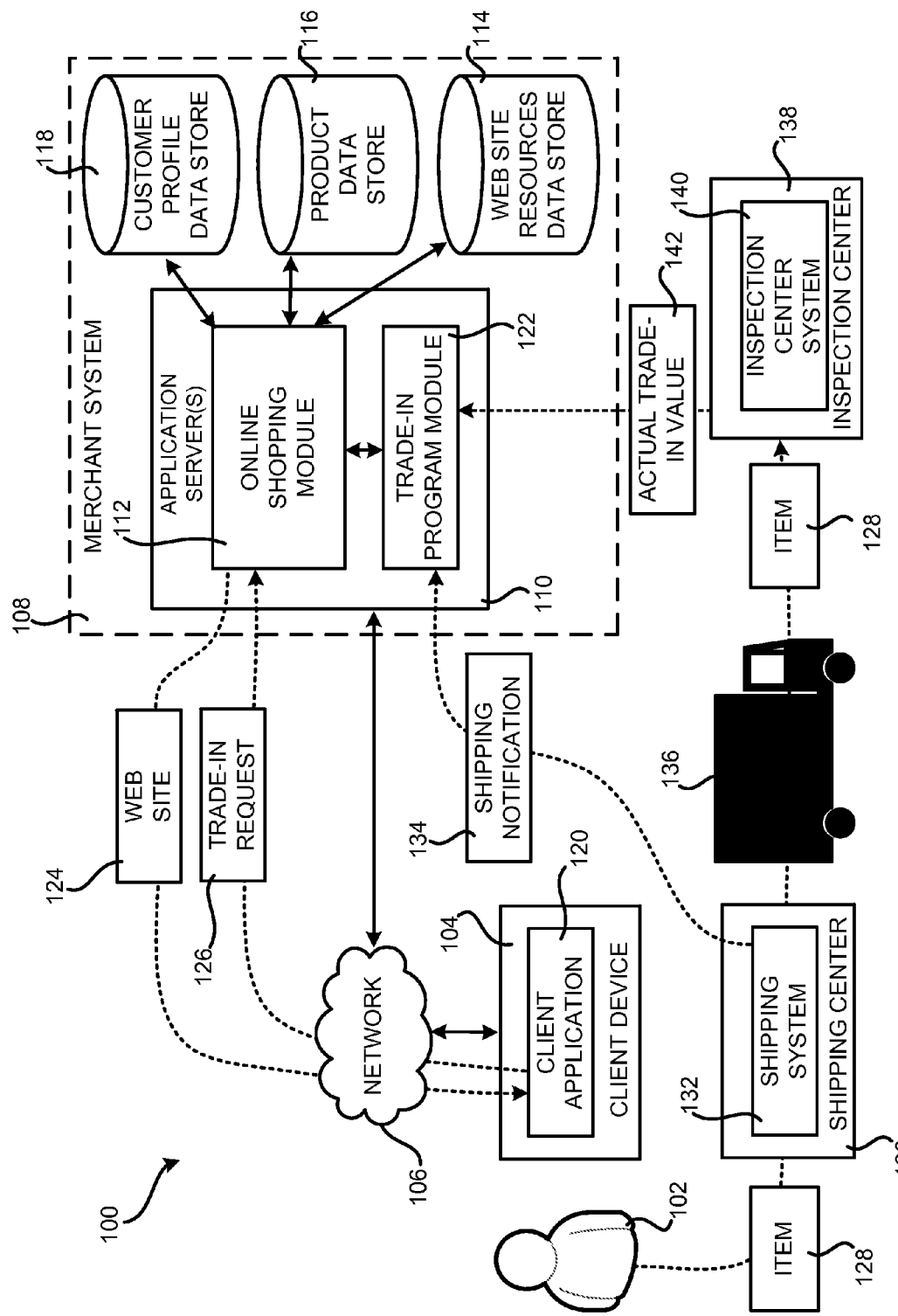
FIG. 1 is a system diagram showing an illustrative configuration for a merchant system that is configured to provide a trade-in program with advance payment, according to one embodiment disclosed herein.

The following detailed description is directed to technologies for a computer-implemented trade-in program that offers advance payment to qualified customers. Through an implementation of the concepts and technologies disclosed herein, qualified customers of a trade-in program can receive advance payment for items. For instance, payment may be provided to a customer at the time a request is made to trade-in an item or at the time a notification is received indicating that the item has been shipped by the customer. By providing advance payment to customers for items traded-in to an online trade-in program in this manner, the delay in receiving payment typically associated with online trade-in programs may be reduced or even eliminated. Additionally, the risk of loss typically associated with advance payment in online trade-in programs may also be minimized utilizing the various concepts and technologies described herein.

According to aspects presented herein, a merchant system is disclosed that is configured to execute an online shopping module that provides a Web site for online shopping. The online shopping module is also configured to maintain and utilize a product database that stores product records for products available for purchase through the Web site. The Web site provides functionality for browsing and searching for Web pages corresponding to products in the product database, for purchasing the products, and for performing other functions.

According to embodiments, the merchant system is also configured to provide an online merchandise trade-in program through the Web site that offers advance payment for traded-in items to certain qualified customers. In particular, a customer of the merchant system can request to trade-in an item through the Web site. The customer may search the product database for the item and select the item to be traded-in. The customer might also provide a description of the condition of the item. For example, the customer might indicate whether the item is in as-new condition, average condition, or in poor condition.

Once the customer has completed the description of the item, or items, to be traded-in, the merchant system may make a determination as to whether the item is an item that is eligible for an advance payment. For instance, in various embodiments only certain types of items might be eligible for advance payment. As a specific example, a merchant might want to limit advance payment only to books or other types of items. In other embodiments, advance payment might be available for any type of physical or digital item traded-in to the merchant.

If the merchant system determines that the item, or items, to be traded-in are eligible for an advance payment, the merchant system may ask the customer whether they would like to receive an advance payment for the traded-in item, or items. If the user requests an advance payment, the merchant system may then attempt to validate a payment instrument associated with the customer. For example, the merchant system might attempt to validate a credit card or other type of payment instrument associated with the customer. If the merchant system cannot validate the payment instrument, the merchant system pays the customer for the traded-in item only after the item has been received by the merchant.

If the merchant system can validate the payment instrument, the merchant system might then determine if the customer is a top reliability tier customer of the merchant. A top reliability tier customer is a customer to which an advance payment for a trade-in may be made by the merchant with relatively little risk that the customer will not provide the traded-in item to the merchant.

The merchant system may utilize various factors to determine if the customer is a top reliability tier customer. For example, according to embodiments, the merchant system might utilize one or more of the following factors to determine if a customer is a top reliability tier customer: whether the customer has successfully traded-in items to the merchant previously; whether the customer has previously completed one or more orders with the merchant system; a length of time that the customer has been registered with the merchant system; whether the customer has a valid payment instrument on file with the merchant system that can be charged; whether the customer has outstanding advance payment trade-in orders pending; and the estimated trade-in value of the traded-in items. The merchant system might also consider other factors when making a determination as to whether a customer is a top reliability tier customer.

If the merchant system determines that the customer is a top reliability tier customer, the merchant system may provide an advance payment to the customer for the total estimated trade-in value of the item, or items, being traded in prior to shipment of the items by the customer. If the merchant system determines that the customer is not a top reliability tier customer, the merchant system may provide an advance payment to the customer for the total estimated trade-in value of the item, or items, being traded in when a notification is received by the merchant indicating that the traded-in item, or items, has been shipped by the customer to the merchant. Payment may be made to the customer for the items in the form of a gift card redeemable with the merchant, to the payment instrument associated with the customer, or in another manner.

When the merchant receives a traded-in item from a customer, the merchant will grade the condition of the item to assign an actual trade-in value to the item. The merchant will then determine whether the actual trade-in value of the item exceeds the estimated trade-in value of the item. If the advance payment paid to the customer is less than the actual trade-in value of an item, a payment instrument associated with the customer will be credited for the difference between the estimated and actual trade-in value. If the advance payment paid to the customer exceeds the actual trade-in value of the item, a payment instrument associated with the customer will be debited for the difference between the estimated trade-in value and the actual trade-in value. If the payment instrument cannot be debited, the customer may be prohibited from receiving further advance payments for a period of time. Additionally, the amount owed by the customer might be recorded for future collection.

In other implementations, the merchant system might provide an advance payment to the customer in some amount less than the total estimated trade-in amount prior to or at the time of shipping a traded-in item. The remainder of the payment might be made at the time the item is shipped and received. Additionally, other safeguards might be implemented in order to ensure that the customer ships the item that is to be traded-in. For instance, a shipping weight for the traded-in item might be compared to the actual shipped weight. If the weights are not within some preset threshold of one another, payment might be delayed until the item is received by the merchant. Other types of safeguards might also be implemented.

It should be appreciated that the embodiments disclosed herein might be utilized with any type of computer, computing system, device, Web site, application program, operating system, or other type of system or component. Accordingly, although the embodiments disclosed herein are primarily presented in the context of a merchant system that embodies the concepts disclosed herein for providing a trade-in program with advance payment for traded-in items, the disclosure presented herein is not limited to such an implementation.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for providing an online merchandise trade-in program with advance payment for traded-in items. As discussed above, the environment 100 is merely illustrative and the embodiments disclosed herein might be utilized in many different types of environments.

The environment 100 includes a user 102 who uses a client device 104 to access a merchant system 108 through a network 106. The user 102 may be an individual or entity that desires to browse, search, purchase, or has purchased, one or more products from the online merchant that operates the merchant system 108. The client device 104 may be a personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to the network 106 and communicating with the merchant system 108. The user 102 might also be referred to herein as a "visitor" to the Web site provided by the merchant system 108 or a "customer" of the merchant system 108.

The network 106 may be a local-area network ("LAN"), a wide-area network ("WAN"), the Internet, or any other networking topology known in the art that connects the client device 104 to the merchant system 108. The merchant system 108 may include a number of application servers 110 that provide various online shopping services to the client device 104 over the network 106. The user 102 may use a client application 120 executing on the client device 104 to access and utilize the online shopping and trade-in services provided by the application servers 110.

In one embodiment the client application 120 is a Web browser application, such as the MOZILLA® FIREFOX® Web browser from MOZILLA FOUNDATION of Mountain View, Calif. The client application 120 exchanges data with the application servers 110 in the merchant system 108 using the hypertext transfer protocol ("HTTP") or another appropriate protocol over the network 106. The client application 120 might also be a stand-alone client application configured for communicating with the application servers 110. The client application 120 might also utilize any number of communication methods known in the art to communicate with the merchant system 108 and/or the application servers 110 across the network 106, including remote procedure calls, SOAP-based Web services, remote file access, proprietary client-server architectures, and the like.

The application servers 110 may execute a number of modules in order to provide online shopping services and the trade-in functionality disclosed herein to the client device 104. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

According to one embodiment, an online shopping module 112 executes on the application servers 110. The online shopping module 112 provides functionality for allowing the user 102 to browse, search, and purchase products available from the online merchant that operates the merchant system 108. For instance, the online shopping module 112 may retrieve information regarding a particular product offered for sale by the online merchant from a product data store 116, generate a Web page containing product information, and transmit the Web page over the network 106 to the client application executing on the client device 104 for display to the user 102.

As shown in FIG. 1, the online shopping module 112 might utilize resources stored in a Web site resources data store 114 to provide an online shopping Web site 124 to the client application 120 that includes the functionality described herein for trading in items to the merchant that operates the merchant system 108. The Web site resources stored in the data store 114 might include, for instance, Web pages, images, text files, program code for generating Web pages, metadata, scripts, executable code, and other types of data utilized to create and/or provide a Web page. Appropriate Web pages and other resources might also be stored in the data store 114 or generated dynamically by the online shopping module 112 to provide the merchandise trade-in program described herein. The online shopping module 112 might also maintain a customer profile data store 118 including information about customers of the merchant system 108, such as their name, address and other contact information, payment information, preferences, and other data.

As illustrated in FIG. 1, the online shopping module 112 might operate in conjunction with a trade-in program module 122 to provide the online merchandise trade-in program described herein. It should be appreciated, however, that the online shopping module 112 might provide the trade-in functionality disclosed herein. In other embodiments, other components might provide the functionality described herein.

As described briefly above, the user 102 can request to trade-in an item 128 through the Web site 124 provided by the online shopping module 112. In one embodiment, the user 102 can search the product data store 116 for the item 128 and indicate that they would like to trade in the item 128. The user 102 might also provide a description of the physical condition of the item 128. For example, the user 102 might indicate whether the item 128 is in as-new condition, average condition, or in poor condition. The user 102 might also be able to provide other information describing the item 128 and/or the condition of the item 128.

Once the user 102 has completed the description of the item 128, the merchant system 108 may make a determination as to whether the item 128 is an item that is eligible for an advance payment. As utilized herein, the term advance payment means a payment for a traded-in item that is made to a customer prior to the time the item is received by the merchant that operates the merchant system 108. In certain implementations, only certain types of items 128 might be eligible for an advance payment. As an example, a merchant might want to limit advance payment only to books, to items previously sold by the merchant to the user 102, or in other ways. In other embodiments, an advance payment might be available for any type of physical or digital item traded-in to the merchant that operates the merchant system 108.

If the merchant system 108 determines that the item 128 to be traded-in is eligible for an advance payment, the merchant system 108 may ask the user 128 whether they would like to receive an advance payment for the traded-in item 128. If the user 102 opts in for advance payment, the merchant system 108 may then attempt to validate a payment instrument associated with the user 102. For example, the merchant system 108 might attempt to validate a credit card or other type of payment instrument associated with the user 102. Payment instruments associated with the user 102 may be stored in the customer profile data store 118 or obtained from the user 102 at the time an advance payment is requested. If the user 102 does not opt in for advance payment or if the merchant system 108 cannot validate the payment instrument associated with the user 102, the merchant system 108 will pay the user 102 for the traded-in item 128 only after the item 128 has been received by the merchant that operates the merchant system 108.

If the merchant system 108 can validate the payment instrument associated with the user 102, the merchant system 108 might then determine if the user 102 is a top reliability tier customer. As mentioned above, a top reliability tier customer is a customer to which an advance payment for a trade-in may be made by the merchant that operates the merchant system 108 with relatively little risk that the customer will not provide the traded-in item 128 to the merchant.

As also mentioned above, the merchant system 108 may utilize various factors to determine if the user 102 is a top reliability tier customer. For example, according to embodiments, the merchant system 108 might utilize one or more of the following factors to determine if the user 102 is a top reliability tier customer: whether the user 102 has successfully traded-in items to the merchant previously; whether the user 102 has previously completed one or more orders with the merchant system 108; a length of time that the user 102 has been registered with the merchant system 108; whether the user 102 has a valid payment instrument on file with the merchant system 108 that can be charged; whether the user 102 has outstanding advance payment trade-in orders pending; and the estimated trade-in value of the traded-in items 128. The merchant system 108 might also consider other factors when making a determination as to whether the user 102 is a top reliability tier customer.

If the merchant system 108 determines that the user 102 is a top reliability tier customer, the merchant system 108 may provide an advance payment to the user 102 for the total estimated trade-in value of the item 128 at the time the trade-in request 126 is made by the user 102 (i.e. prior to shipment of the item 128 by the user 102). If the merchant system 108 determines that the user 102 is not a top reliability tier customer, the merchant system 108 may provide an advance payment to the customer for the total estimated trade-in value of the item, or items, being traded in when a shipping notification 134 is received by the merchant system 108 indicating that the traded-in item 128 has been shipped by the user 102 to the merchant. Payment may be made to the user 102 for the item 128 in the form of a gift card redeemable with the merchant system 108, to the credit card or other type of payment instrument associated with the user 102, or in another manner.

In order to receive the shipping notification 134 when the user 102 ships the item 128, the merchant system 108 may generate a shipping label for use by the user 102 when shipping the item 128 to the merchant. When the user 102 takes the item 128 to a shipping center 130 for shipment, a shipping system 132 operated by the shipper will scan the shipping label and, in response thereto, send the shipping notification 134 to the trade-in program module 122. The item 128 may then be shipped to an inspection center 138 operated by the merchant via truck 136, air freight, a combination of ground and air transportation, or in another manner.

When the merchant receives the item 128 at the inspection center 138, the merchant will grade the condition of the item 128 and assign an actual trade-in value 142 to the item 128. An inspection center system 140 may send the actual trade-in value 142 to the trade-in program module 122. The merchant system 108 then determines whether the actual trade-in value 142 of the item exceeds the estimated trade-in value of the item generated (i.e. the advance payment paid to the user 102) at the time the user submitted the trade-in request 126.

If the advance payment paid to the user 102 is less than the actual trade-in value 142 of the item 128, a payment instrument associated with the user 102 will be credited for the difference between the estimated and actual trade-in values. If the advance payment paid to the user 102 exceeds the actual trade-in value 142 of the item 128, a payment instrument associated with the user 102 will be debited for the difference between the estimated trade-in value and the actual trade-in value 142. If the payment instrument cannot be debited, the user 102 may be prohibited from receiving further advance payments for a period of time. Additionally, the amount owed by the user 102 might be recorded for future collection. Additional details regarding these and other aspects of the online trade-in system with advance payment disclosed herein will be provided below with regard to FIGS. 2A-6.

Figure 2A:
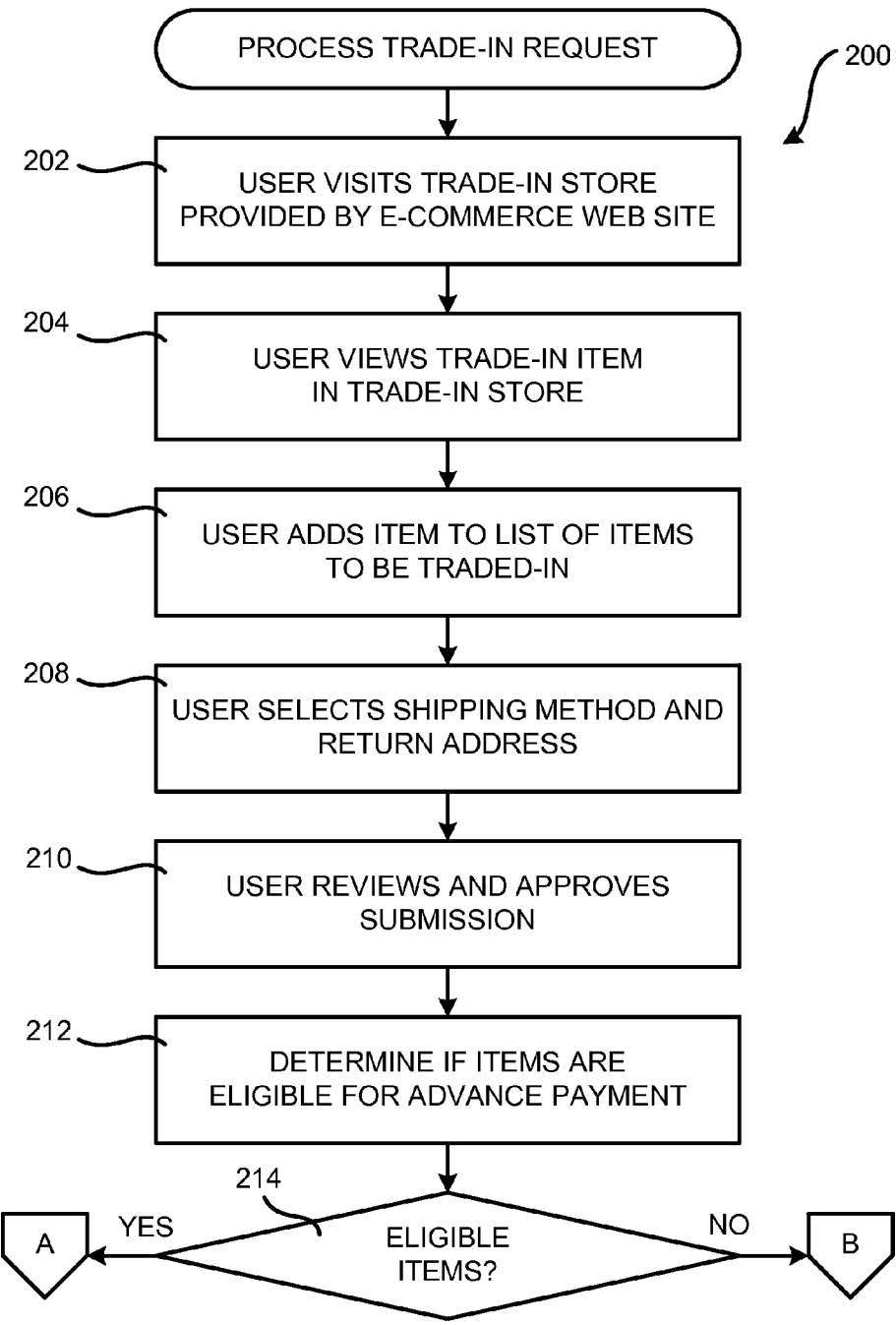
FIGS. 2A-2B are flow diagrams showing aspects of one illustrative routine for processing a request to trade-in an item to a trade-in program that provides advance payment, according to one embodiment disclosed herein.
Figure 2B:
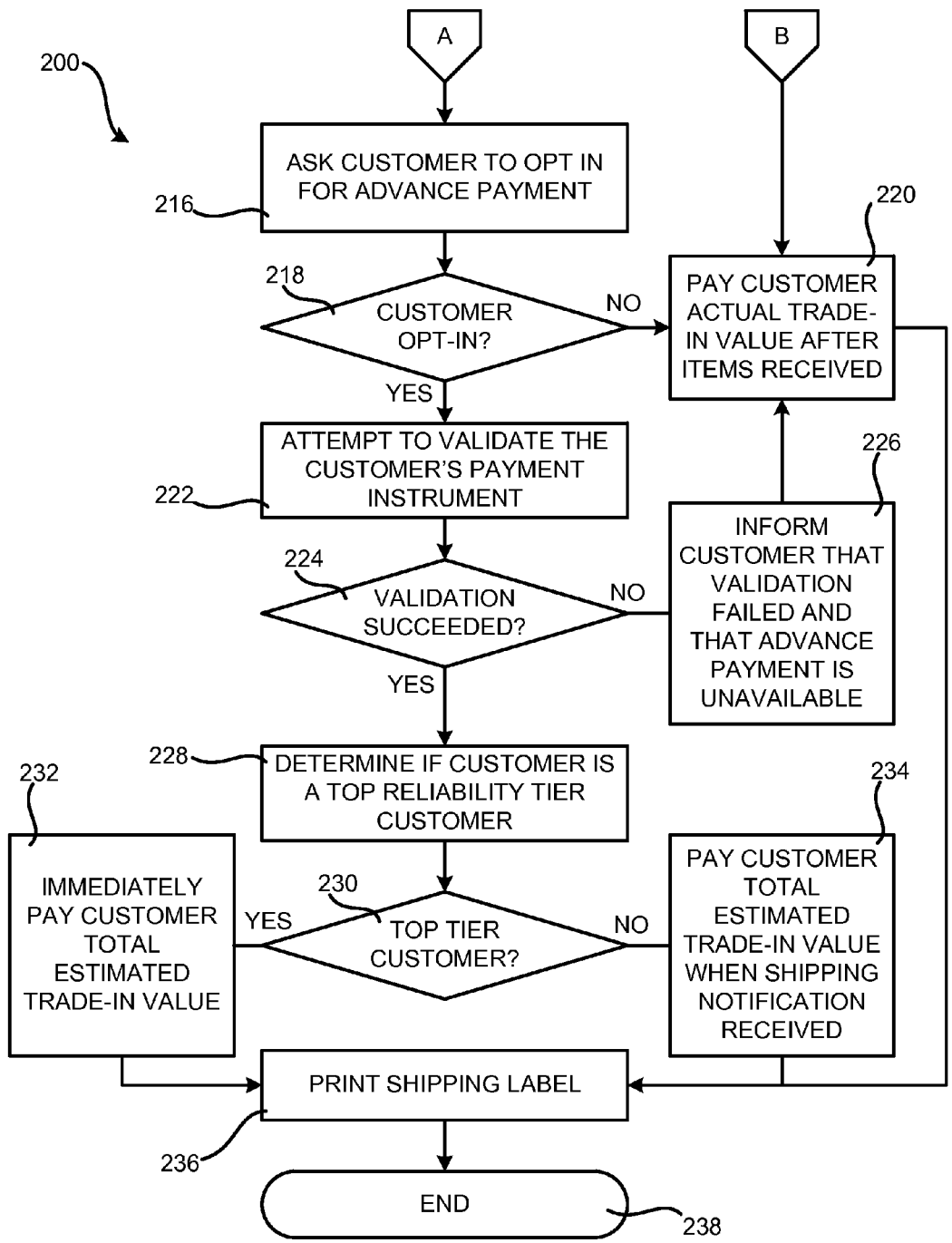

Turning now to FIGS. 2A-2B, additional details will be provided regarding the embodiments described herein for a computer-implemented trade-in program that provides advance payment for traded-in items. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIGS. 2A-2B are flow diagrams showing aspects of one illustrative routine 200 for processing a request to trade-in an item 128 to a trade-in program that provides advance payment, according to one embodiment disclosed herein. The routine 200 begins at operation 202, where a user 102 utilizes a client device 104 and a client application 120 to visit an online trade-in store provided by the merchant system 108 by way of the Web site 124. As described above, although the embodiments described herein are primarily presented in the context of a Web site that provides the trade-in functionality presented herein, other embodiments might utilize other mechanisms. For instance, the online shopping module 112 might operate in conjunction with a stand-alone client application 120 to provide the trade-in program described herein. Other implementations might also be utilized.

From operation 202, the routine 200 proceeds to operation 204, where the user 102 views the item 128 to be traded-in to the trade-in store. As mentioned above, the user 102 might search for the item 128 in the product data store 116 or in a data store that identifies items 128 eligible for trade-in. At operation 206, the user 102 adds the item 128 to a list of items to be traded in. The user 102 might also specify the condition of the item 128 to be traded in. Based upon the item 128 and the condition of the item 128 as specified by the user 102, the merchant system 108 can generate an estimated trade-in value for the item 128. The user 102 might also be given an opportunity to indicate whether they would like to trade-in the item 128 for the estimated trade-in value.

If the user 102 agrees to trade-in the item 128, the routine 200 proceeds from operation 206 to operation 208, where the user 102 selects a shipping method for the item 128 and provides a return shipping address. Once this information has been provided, the routine 200 proceeds to operation 210, where the user 102 is given an opportunity to review and approve all of the provided information and to give final agreement to the trade-in of the item 128. If the user 102 approves all of the provided information and consents to the trade-in of the item 128, the routine 200 proceeds from operation 210 to operation 212.

At operation 212, the merchant system 108 determines whether the item 128 is eligible for an advance payment. As mentioned above, the merchant that operates the merchant system 108 might limit advance payment to certain types of items. For example, the merchant might limit advance payment to certain types of physical items such as books, might limit advance payment to items previously sold by the merchant to the user 102, or might limit advance payment to other types of items or in other ways. If the item 128 is not eligible for advance payment, the routine 200 proceeds from operation 214 to operation 220 where the user 102 is paid the actual trade-in value of the item 128 at the time the item 128 is received by the merchant. If the item 128 is eligible for advance payment, the routine 200 proceeds from operation 214 to operation 216.

At operation 216, the merchant system 108 asks the user 102 if they would like to receive an advance payment for the item 128. In this regard, the merchant system 108 may indicate to the user 102 that a credit card or other type of payment instrument is required in order to receive the advance payment. The user 102 may then elect to receive an advance payment or to opt out of the advance payment process. If the user 102 elects to opt out of an advance payment, the routine 200 proceeds from operation 218 to operation 220, where the user 102 is paid the actual trade-in value of the item 128 after the item 128 is received at the inspection center 138.

If the user 102 elects to receive an advance payment for the item 128, the routine 200 proceeds from operation 218 to operation 222. At operation 222, the merchant system 108 attempts to validate a payment instrument associated with the user 102. For instance, the merchant system 108 might attempt to validate a credit card associated with the user 102. If the payment instrument cannot be validated, the routine 200 proceeds from operation 224 to operation 226. At operation 226, the user 102 is informed that their payment instrument could not be validated and that advance payment is not available for the trade-in of the item 128. The routine 200 then proceeds from operation 226 to operation 220, where the user 102 is paid the actual trade-in value of the item 128 after the item 128 is received at the inspection center 138.

If the payment instrument is successfully validated at operation 224, the routine 200 proceeds from operation 224 to operation 228. At operation 228, the merchant system 108 determines whether the user 102 is a top reliability tier customer. As discussed above, the merchant system 108 might utilize various factors to determine if the user 128 is a top reliability tier customer.

If the merchant system 108 determines that the user 102 is not a top reliability tier customer, the routine 200 proceeds from operation 230 to operation 234. At operation 234, the user 102 is paid the total estimated trade-in value for the item 128 when the shipping notification 134 is received in the manner described above. If, however, the merchant system 108 determines that the user 102 is a top reliability tier customer, the routine 200 proceeds from operation 230 to operation 232, where the user 102 is immediately paid the total estimated trade-in value for the item 128. Payment may be made to the user 102 in the form of a gift card that is redeemable with the merchant system 108, to a credit or debit card, by way of a wire or electronic funds transfer ("EFT"), or in another manner. In this way, a top reliability tier customer can receive payment at the time the trade-in request 126 is processed and before the user 102 ships the item 128. Customers that are not top reliability tier customers can receive payment at the time the merchant system 108 receives the shipping notification 134 as described in greater detail below.

From operations 220, 232, and 234, the routine 200 proceeds to operation 236, where the client application 120 is utilized to print a shipping label on a printer (not shown) connected to the client device 120. As mentioned above, the shipping label can be configured and printed in a manner that allows the shipping system 132 to transmit a shipping notification 134 to the trade-in program module 122 at the time a package containing the item 128 has been shipped. Mechanisms for printing such a label are well known in the art. Additional details regarding one process disclosed herein for processing a shipping notification 134 will be provided below with regard to FIG. 3.

Figure 3:
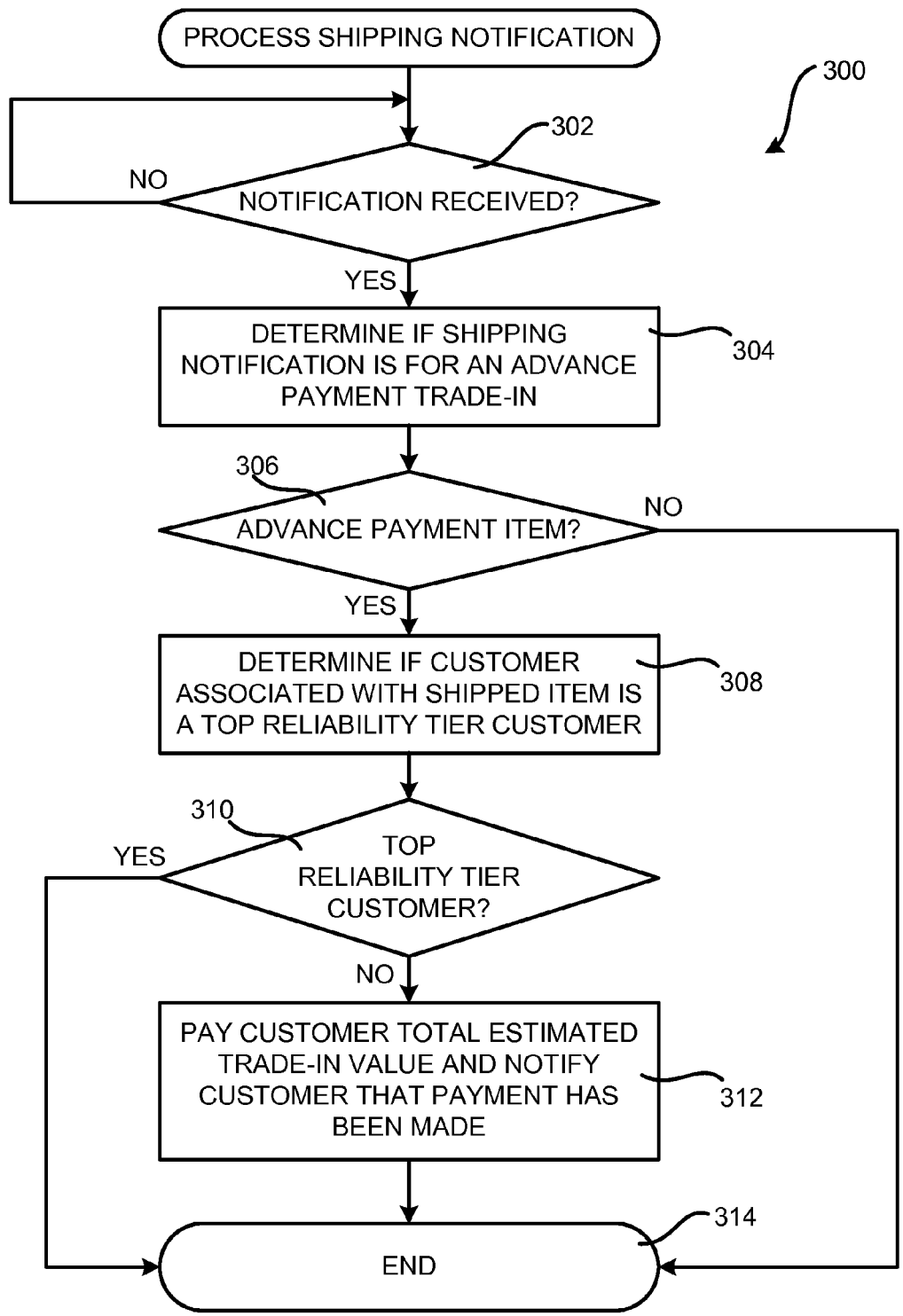
FIG. 3 is a flow diagram showing aspects of one illustrative routine for processing a shipping notification in a trade-in program that provides advance payment, according to one embodiment disclosed herein.

FIG. 3 is a flow diagram showing aspects of one illustrative routine 300 for processing a shipping notification 134 in a computer-implemented trade-in program that provides advance payment, according to one embodiment disclosed herein. The routine 300 begins at operation 302, where the trade-in program module 122 determines whether a shipping notification 134 has been received. If a shipping notification 134 has been received, the routine 300 proceeds from operation 302 to operation 304.

At operation 304, the trade-in program module 122 determines if the received shipping notification 134 is for an item 128 for which an advance payment has been previously made. If the shipping notification 134 is not for an item 128 for which an advance payment has been made, the routine 300 proceeds from operation 306 to operation 314, where it ends. If the received shipping notification 134 is for an item for which an advance payment has been previously made, the routine 300 proceeds from operation 306 to operation 308. It should be appreciated that multiple trade-in items might be included in the same shipment. In this case, payment for multiple items might be made in response to receiving a single shipping notification 134 for a shipment containing multiple trade-in items.

At operation 308, the trade-in program module 122 determines if the user 102 associated with the shipping notification 134 is a top reliability tier customer. If the user 102 associated with the shipping notification 134 is a top reliability tier customer, the user 102 has already received payment for the full estimated trade-in value of the item 128 associated with the shipping notification. Accordingly, if the user 102 associated with the shipping notification 134 is a top reliability tier customer, the routine 300 proceeds from operation 310 to operation 314, where it ends.

If the user 102 associated with the shipping notification 134 is not a top reliability tier customer, then the routine 300 proceeds from operation 310 to operation 312. At operation 312, payment is made to the user 102 for the total estimated trade-in value of the item 128. As discussed above, payment may be made to the user 102 in the form of a gift card that is redeemable with the merchant system 108. In other implementations, payment may be made to a credit or debit card, by way of a wire transfer, an EFT, or in another manner.

Figure 4:
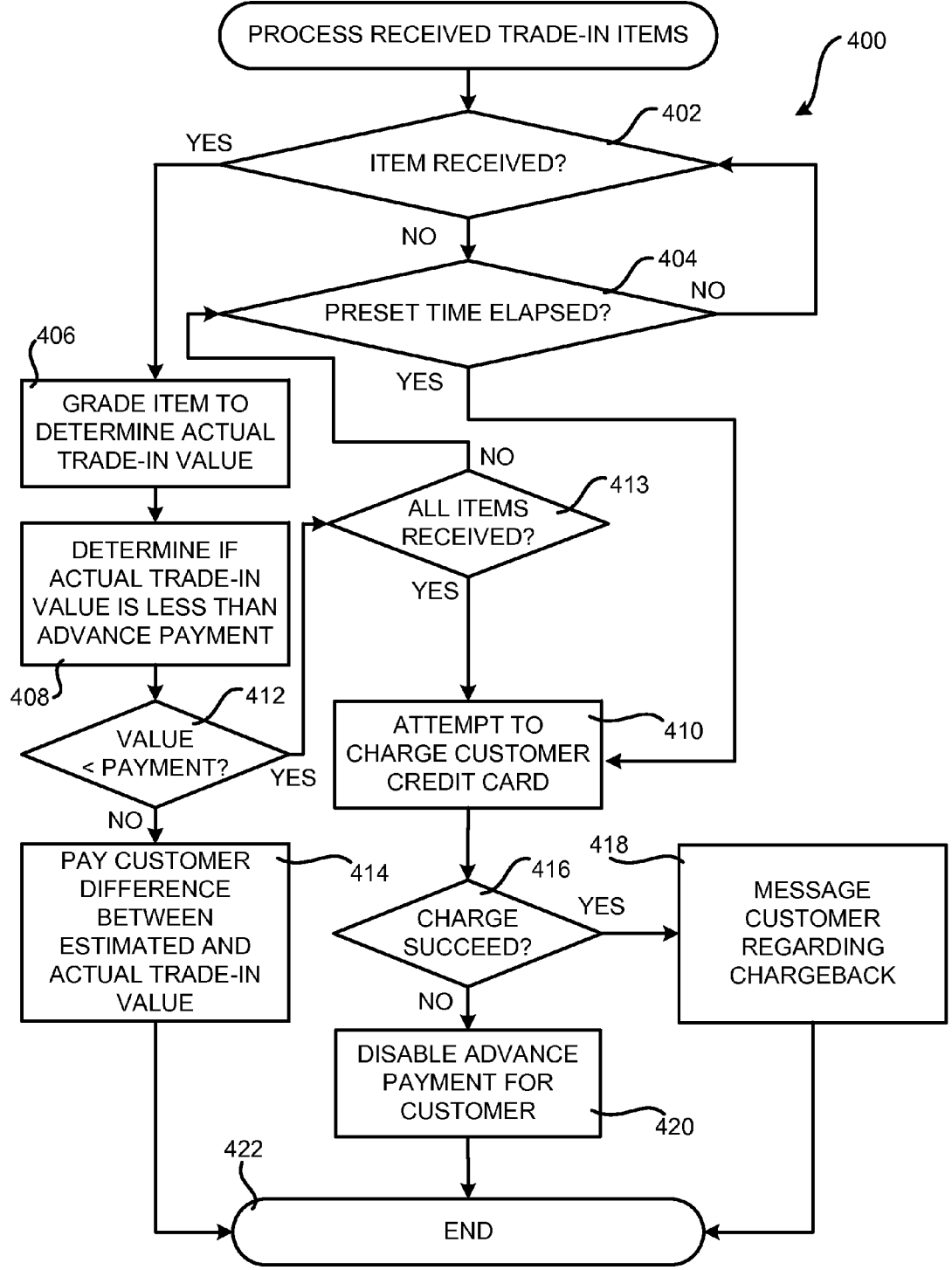
FIG. 4 is a flow diagram showing aspects of one illustrative routine for processing a received trade-in item in a trade-in program that provides advance payment, according to one embodiment disclosed herein.

FIG. 4 is a flow diagram showing aspects of one illustrative routine 400 for processing a received trade-in item 128 in a computer-implemented trade-in program that provides advance payment, according to one embodiment disclosed herein. The routine 400 begins at operation 402, where the trade-in program module 122 determines if a trade-in item 128 has been received. If the item 128 has not been received, the routine 400 proceeds to operation 404, where the trade-in program module 122 determines whether a preset period of time has elapsed since the process for trading in the item 128 was initiated. For instance, a period of 25 days or another time period may be specified as the time period in which traded-in items must be received. If the item 128 has not been received in the specified period, the routine 400 will proceed from operation 404 to operation 410, where an attempt is made to charge a payment instrument associated with the user 102 for the total amount of the advance payment.

If, at operation 402, the trade-in program module 122 determines that an item 128 has been received at the inspection center 138, the routine 400 proceeds to operation 406. At operation 406, the condition of the received item 128 is graded to determine the actual trade-in value 142 of the item 128. Once the actual trade-in value 142 of the item has been determined, the routine 400 proceeds to operation 408, where the trade-in program module 122 determines whether the actual trade-in value 142 of the item 128 is less than any advance payment made for the item 128. If the actual trade-in value 142 of the item 128 is equal to the advance payment, then no credit or debit is made. If, however, the actual trade-in value 142 of the item 128 is more than the estimated trade-in value of the item 128 (i.e. the advance payment), then the payment instrument associated with the user 102 is credited for the difference between the advance payment and the actual trade-in value 142 at operation 414.

If, at operation 412, the trade-in program module 122 determines that the actual trade-in value 142 of the item 128 is less than the advance payment previously made for the item 128, then the routine 400 proceeds from operation 412 to operation 413. At operation 413, the trade-in program module 122 determines whether all of the items for the current trade-in order have been received. If not, the routine 400 proceeds from operation 413 to operation 404, where another determination is made as to whether the preset time has elapsed. If all of the items have been received, the routine 400 proceeds from operation 413 to operation 410. At operation 410, the trade-in program module 122 attempts to charge the payment instrument associated with the user 102 for the difference between the estimated trade-in value of the item 128 (i.e. the advance payment) and the actual trade-in value 142 of the item 128. By determining at operation 413 whether all of the items have been received, a single charge can be made at operation 410.

If the chargeback to the payment instrument succeeds at operation 410, then the routine 400 proceeds from operation 416 to operation 418. At operation 418, a message is transmitted to the user 102 indicating that a chargeback has been made to the user's payment instrument. If the chargeback fails, however, the routine 400 proceeds from operation 416 to operation 420. At operation 420, the trade-in program module 122 disables future advance payments 128 to the user 102 for a period of time. Additionally, the amount owed by the user 102 may be recorded for future payment by the user 102. Other types of actions might also be initiated. From operations 414 and 420, the routine 400 proceeds to operation 422, where it ends.

Figure 5:
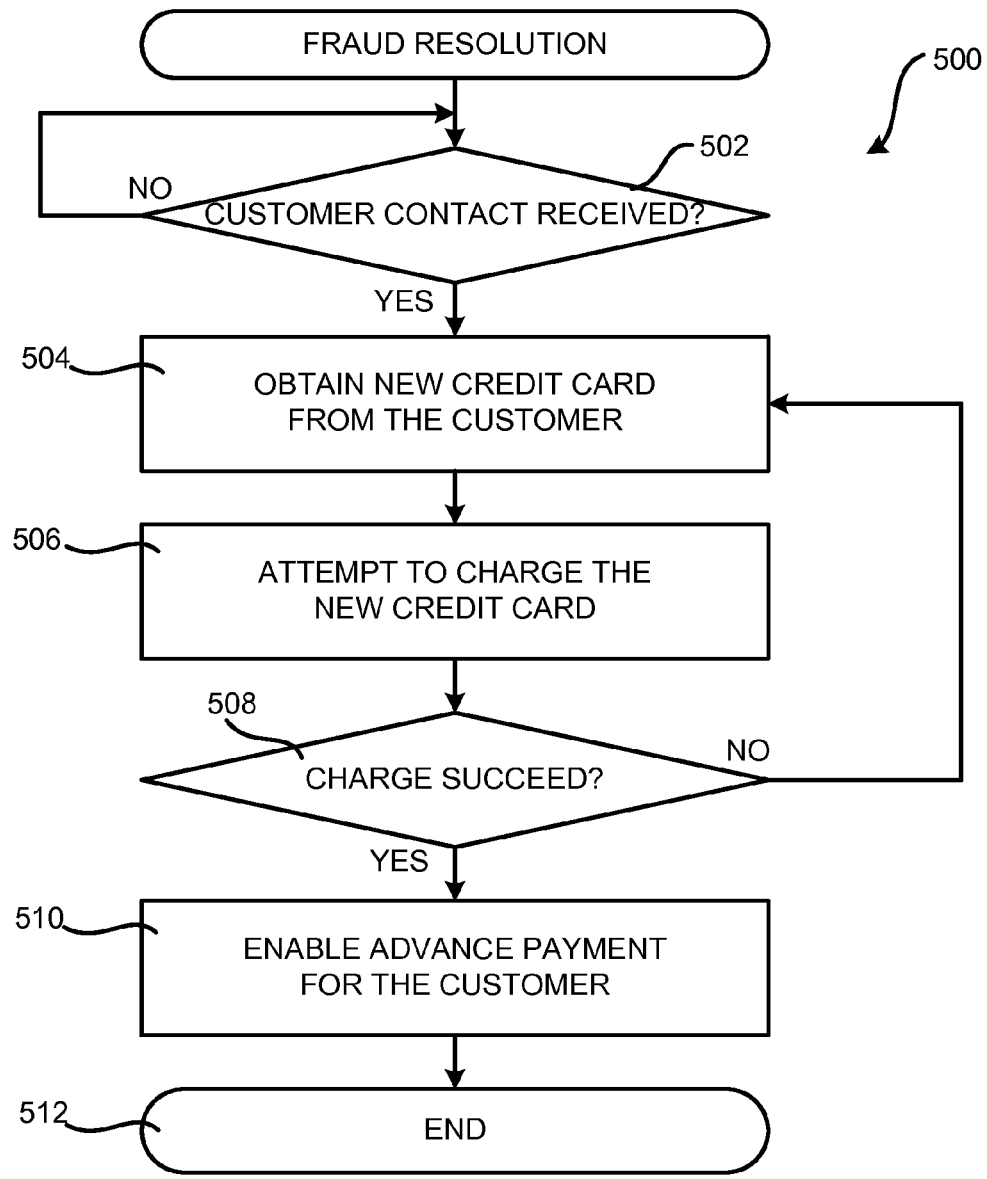
FIG. 5 is a flow diagram showing aspects of one illustrative routine for fraud resolution in a trade-in program that provides advance payment, according to one embodiment disclosed herein.

FIG. 5 is a flow diagram showing aspects of one illustrative routine 500 for fraud resolution in a computer-implemented trade-in program that provides advance payment, according to one embodiment disclosed herein. The routine 500 is typically performed after an attempt to charge a payment instrument associated with a user 102 has failed. For instance, the routine 500 may be performed after an attempt to charge a customer's credit card for the difference between an estimated trade-in value and an actual trade-in value has failed. The routine 500 might also be performed after an attempt to charge a customer's credit card for the total amount of an advance payment provided to the customer when the customer fails to send the traded-in item 128.

The routine 500 begins at operation 502, where the trade-in program module 112 determines whether customer contact has been received regarding a failed payment attempt. For instance, the user 102 might contact the merchant system 108 through the Web site 124 in an attempt to address the failed payment attempt. If such a contact is received, the routine 500 proceeds from operation 502 to operation 504.

At operation 504, a new payment instrument is received from the user 102. For example, the Web site 124 might prompt the user 102 to provide a new credit card number. Once the new payment instrument has been provided, the routine 500 proceeds from operation 504 to operation 506, where the trade-in program module 122 attempts to charge the new payment instrument. For example, the trade-in program module 122 might attempt to charge a new credit card for the total amount of an advance payment where the user 102 failed to send the traded-in item 128. The trade-in program module 122 might also attempt to charge the new credit card for the difference between the advance payment and the actual trade-in value 142.

If the charge does not succeed, the routine 500 may proceed back to operation 504 where the user 102 may be prompted to provide another new payment instrument. If the charge is successful, the routine 500 proceeds from operation 508 to operation 510 where advance payment for traded-in items is once again enabled for the user 102. If other types of limitations have been placed upon the user's account, these limitations might also be removed in response to the user 102 settling his or her account. From operation 510, the routine 500 proceeds to operation 512, where it ends.

Figure 6:
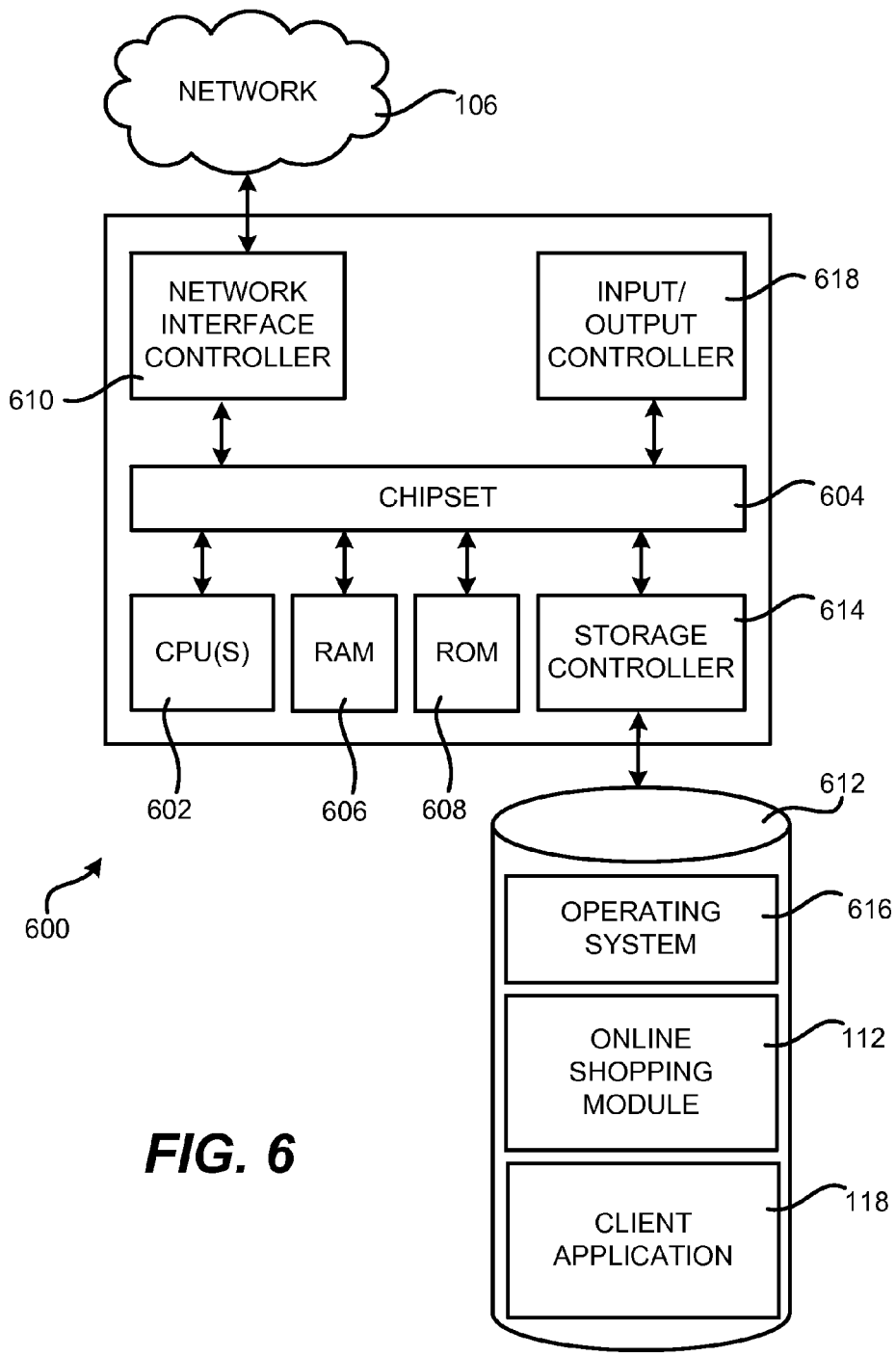
FIG. 6 is a computer architecture diagram showing one illustrative computer hardware architecture for use in computing devices configured to implement the concepts and technologies disclosed herein in one embodiment.

FIG. 6 shows an example computer architecture for a computer 600 capable of executing the software components described herein for providing a computer-implemented merchandise trade-in program with advance payment in the manner presented above. The computer architecture 600 shown in FIG. 6 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the application servers 110, the client device 104, or other computing platform.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 602 operate in conjunction with a chipset 604. The CPUs 602 are standard programmable processors that perform arithmetic and logical operations necessary for the operation of the computer 600.

The CPUs 602 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 604 provides an interface between the CPUs 602 and the remainder of the components and devices on the baseboard. The chipset 604 may provide an interface to a random access memory ("RAM") 606, used as the main memory in the computer 600. The chipset 604 may further provide an interface to a computer-readable storage medium such as a read-only memory ("ROM") 608 or non-volatile RAM ("NVRAM") for storing basic routines that that help to startup the computer 600 and to transfer information between the various components and devices. The ROM 608 or NVRAM may also store other software components necessary for the operation of the computer 600 in accordance with the embodiments described herein.

According to various embodiments, the computer 600 may operate in a networked environment using logical connections to remote computing devices and computer systems through a network, such as a local-area network ("LAN"), a wide-area network ("WAN"), the Internet, or any other networking topology known in the art that connects the computer 600 to remote computers. The chipset 604 includes functionality for providing network connectivity through a network interface controller ("NIC") 610, such as a gigabit Ethernet adapter.

For example, the NIC 610 may be capable of connecting the computer 600 to other computing devices, such as the application servers 110, the client device 104, a data storage system in the merchant system 108, and the like, over the network 106 described above in regard to FIG. 1. It should be appreciated that multiple NICs 610 may be present in the computer 600, connecting the computer to other types of networks and remote computer systems.

The computer 600 may be connected to a mass storage device 612 that provides non-volatile storage for the computer. The mass storage device 612 may store system programs, application programs, other program modules, and data, which have been described in greater detail herein. The mass storage device 612 may be connected to the computer 600 through a storage controller 614 connected to the chipset 604. The mass storage device 612 may consist of one or more physical storage units. The storage controller 614 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 600 may store data on the mass storage device 612 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 612 is characterized as primary or secondary storage, or the like.

For example, the computer 600 may store information to the mass storage device 612 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the physical storage units.

In addition to the mass storage device 612 described above, the computer 600 might have access to other computer-readable media to store and retrieve information, such as program modules, data structures, or other data. It should be appreciated by those skilled in the art that computer-readable media can be any available media that may be accessed by the computer 600, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 612 may store an operating system 616 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 612 may store other system or application programs and data utilized by the computer 600. For instance, when utilized to implement the client device 104, the mass storage device may store the client application 120. When utilized to implement one or more of the application servers 110, the mass storage device may store the online shopping module 112 and/or the trade-in program module 122.

In one embodiment, the mass storage device 612 or other computer-readable storage media may be encoded with computer-executable instructions that, when loaded into the computer 600, transform the computer from a general-purpose computing system into a special-purpose computer capable of implementing the embodiments described herein. These computer-executable instructions transform the computer 600 by specifying how the CPUs 602 transition between states, as described above. According to one embodiment, the computer 600 has access to computer-readable storage media storing computer-executable instructions that, when executed by the computer, perform the various routines and operations described herein.

The computer 600 may also include an input/output controller 618 for receiving and processing input from a number of input devices, such as a keyboard, a mouse, a touchpad, a touch screen, an electronic stylus, or other type of input device. Similarly, the input/output controller 618 may provide output to a display device, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for providing a computer-implemented trade-in program with advance payment for traded-in items have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing an advance payment for the trade-in of an item, the computer-implemented method comprising executing instructions in a computer system to perform the operations of:

receiving a request from a user at a merchant system to trade-in an item;

in response to receiving the request, determining by way of a computing system in the merchant system whether the item is eligible for an advance payment for the item;

in response to determining that the item is eligible for an advance payment for the item, determining if the user is a top reliability tier customer of a merchant that operates the merchant system;

in response to determining that the user is a top reliability tier customer of the merchant, providing an advance payment to the user for a total estimated trade-in value of the item prior to the shipment of the item by the user to the merchant; and in response to determining that the user is a not a top reliability tier customer of the merchant, providing an advance payment to the user for the total estimated trade-in value of the item in response to receiving an indication that the item has been shipped by the user to the merchant.

2. The computer-implemented method of claim 1, further comprising in response to determining that item is eligible for an advance payment for the item:

determining whether a payment instrument associated with the user can be validated; and in response to determining that the payment instrument associated with the user cannot be validated, providing payment to the user for the item only after the item has been received by the merchant.

3. The computer-implemented method of claim 2, further comprising:

assigning an actual trade-in value to the item after the item has been received by the merchant;

determining if the advance payment paid to the user exceeds the actual trade-in value of the item; and in response to determining that the advance payment paid to the user exceeds the actual trade-in value of the item, charging the payment instrument for the difference between the advance payment paid to the user and the actual trade-in value.

4. The computer-implemented method of claim 3, further comprising:

determining if the advance payment paid to the user is less than the actual trade-in value of the item; and in response to determining that the advance payment paid to the user is less than the actual trade-in value of the item, providing a payment to the user for the difference between the advance payment paid to the user and the actual trade-in value.

5. The computer-implemented method of claim 4, wherein the determination as to whether the user is a top reliability tier customer of the merchant that operates the merchant system is based upon one or more of: whether the user has successfully traded-in items to the merchant previously, whether the user has previously completed one or more orders with the merchant system, a length of time that the user has been registered with the merchant system, whether the user has a valid payment instrument on file with the merchant system that can be charged, whether the user has outstanding advance payment trade-in orders pending, and the estimated trade-in value of the item.

6. A computer-readable storage medium having computer-executable instructions stored thereupon which, when executed by the computer, cause the computer to:

receive a request from a user to trade-in an item at a merchant system;

determine in response to receiving the request whether an advance payment for the item can be made; and in response to determining that an advance payment for the item can be made, to provide an advance payment to the user for a total estimated trade-in value of the item prior to the shipment of the item by the user to the merchant or in response to receiving an indication that the item has been shipped by the user to the merchant.

7. The computer-readable storage medium of claim 6, having further computer-executable instructions stored thereupon which, when executed by the computer, cause the computer to:

determine whether the user is a top reliability tier customer of a merchant that operates the merchant system in response to receiving the request; and to provide the advance payment to the user for the total estimated trade-in value of the item in response to receiving an indication that the item has been shipped by the user to the merchant if the user is not a top reliability tier customer.

8. The computer-readable storage medium of claim 7, having further computer-executable instructions stored thereupon which, when executed by the computer, cause the computer to provide the advance payment to the user for the total estimated trade-in value of the item prior to the shipment of the item by the user in response to determining that the user is a top reliability tier customer.

9. The computer-readable storage medium of claim 8, having further computer-executable instructions stored thereupon which, when executed by the computer, cause the computer to:

determine if the advance payment paid to the user exceeds an actual trade-in value of the item; and to charge a payment instrument associated with the user for a difference between the advance payment paid to the user and the actual trade-in value in response to determining that the advance payment paid to the user exceeds the actual trade-in value of the item.

10. The computer-readable storage medium of claim 9, having further computer-executable instructions stored thereupon which, when executed by the computer, cause the computer to:

determine if the advance payment paid to the user is less than the actual trade-in value of the item; and to provide a payment to the user for a difference between the advance payment paid to the user and the actual trade-in value in response to determining that the advance payment paid to the user is less than the actual trade-in value of the item.

11. The computer-readable storage medium of claim 10, having further computer-executable instructions stored thereupon which, when executed by the computer, cause the computer to:

determine if the payment instrument was successfully charged for the difference between the advance payment paid to the user and the actual trade-in value; and in response to determining that the payment instrument was not successfully charged, to disable future advance payments to the user for a period of time.

12. An apparatus for providing an advance payment for the trade-in of an item, the apparatus comprising:

at least one processor; and a computer-readable storage medium having computer-executable instructions stored thereon which, when executed on the at least one processor, causes the apparatus to determine whether a customer of a merchant is eligible for a payment for a trade-in of an item prior to receiving the item from the customer at the merchant, and initiating an advance payment to the customer for the item prior to receiving the item from the customer in response to determining that the customer is eligible.

13. The apparatus of claim 12, wherein the advance payment is made to the customer either prior to the shipment of the item or in response to receiving a notification that the item has been shipped depending upon the reliability of the customer as computed by the merchant.

14. The apparatus of claim 13, wherein the computer-readable storage medium having further computer-executable instructions stored thereon which, when executed on the at least one processor, causes the apparatus to:
debit a payment instrument associated with the customer for the difference between the advance payment and an actual trade-in value of the item if the advance payment is greater than the actual trade-in value; and to
credit a payment instrument associated with the customer for the difference between the advance payment and the actual trade-in value of the item if the advance payment is less than the actual trade-in value of the item.

15. The apparatus of claim 14, wherein the reliability of the customer as computed by the merchant is based at least in part upon whether the user has successfully traded-in items to the merchant previously.

16. The apparatus of claim 14, wherein the reliability of the customer as computed by the merchant is based at least in part upon whether the user has previously completed one or more orders with the merchant system.

17. The apparatus of claim 14, wherein the reliability of the customer as computed by the merchant is based at least in part upon a length of time that the user has been registered with the merchant system.

18. The apparatus of claim 14, wherein the reliability of the customer as computed by the merchant is based at least in part upon whether the user has a valid payment instrument on file with the merchant system that can be charged.

19. The apparatus of claim 14, wherein the reliability of the customer as computed by the merchant is based at least in part upon whether the user has other outstanding advance payment trade-in orders pending.

20. The apparatus of claim 14, wherein the reliability of the customer as computed by the merchant is based at least in part upon the estimated trade-in value of the item.

* * * * *